No. 847,792. PATENTED MAR. 19, 1907.
G. LINDNER.
CASK OR VESSEL FROM WHICH LIQUID IS DISCHARGED UNDER PRESSURE.
APPLICATION FILED APR. 15, 1905.
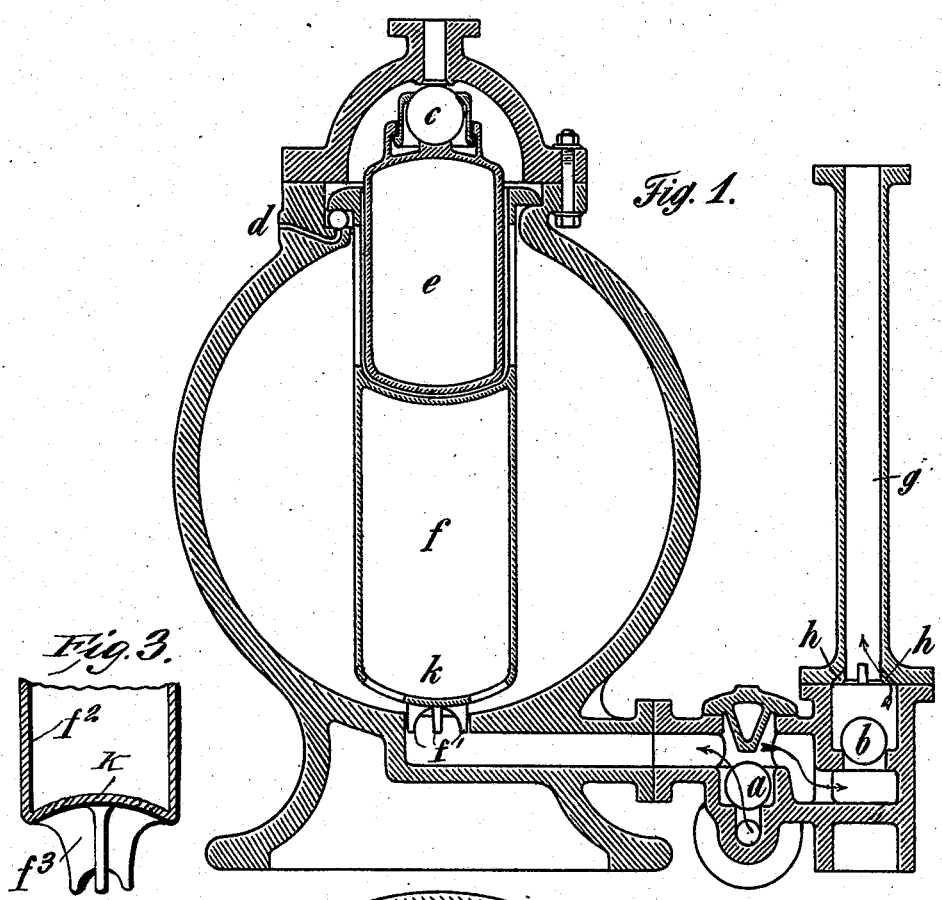
Fig. 1.
Fig. 3.
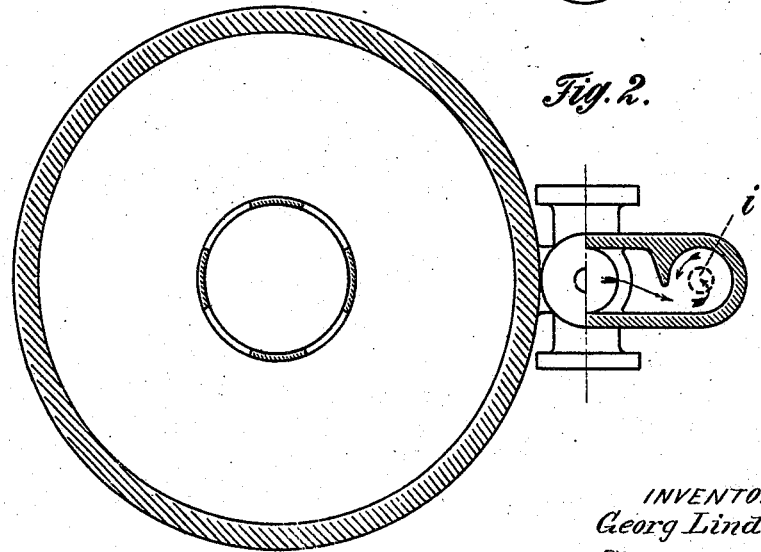
Fig. 2.
INVENTOR
Georg Lindner
BY
ATTORNEYS
Witnesses
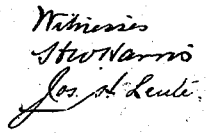

UNITED STATES PATENT OFFICE.

GEORG LINDNER, OF KARLSRUHE, GERMANY, ASSIGNOR TO DEUTSCHE STEINZEUG WAARENFABRIK FÜR CANALISATION UND CHEMISCHE INDUSTRIE, OF FRIEDRICHSFELD, GERMANY.

CASK OR VESSEL FROM WHICH LIQUID IS DISCHARGED UNDER PRESSURE.

No. 847,792. Specification of Letters Patent. Patented March 19, 1907.

Application filed April 15, 1905. Serial No. 255,821.

*To all whom it may concern:*

Be it known that I, GEORG LINDNER, a professor, and a subject of the Grand Duke of Baden, residing at 88 Kriegstrasse, in the city of Karlsruhe, in the Grand Duchy of Baden, part of the German Empire, have invented a certain new and useful Improvement in Apparatus for Raising Liquids, of which the following is a specification.

This invention relates to casks or vessels which are alternately filled with liquid and then have their contents discharged by means of compressed air. Such vessels have already been constructed with a float for the purpose of automatically controlling their action, which float, when the liquid has attained a high level, closes the discharge-opening for air and opens the inlet-opening for compressed air, while when the liquid has sunk to a low level the float automatically reverses the positions of the two valves. In this arrangement the apparatus operates as a force-pump, the excess or driving pressure of the compressed air being wasted at each stroke.

According to the present invention an arrangement is employed which has for its object to cause the vessel to operate with expansion of the compressed air in order to fully utilize the energy of the compressed air, and thus to effect an economy in the driving power. For this purpose two floats are employed. The compressed air, which is generally available with from four to five atmospheres excess pressure, enters the vessel with a higher pressure than is necessary for overcoming the statical pressure of the liquid column, corresponding to the height to which the liquid has to be raised. In consequence the air-pressure at the commencement accelerates the motion of the liquid and maintains a rapid curent. When the vessel has been emptied to a certain extent in this way, the one float closes the air-supply. The compressed air then confined in the vessel now operates with expansive action in further expelling the liquid until its pressure has sunk to a degree corresponding to the pressure of the liquid-column. When this condition has been attained, the second float opens the air-discharge.

On the accompanying drawing is shown an apparatus constructed according to the above-described invention.

Figure 1 shows a vertical section of the pressure vessel and apparatus combined therewith. Fig. 2 shows a sectional plan thereof, and Fig. 3 is a detail view of a modified form of float.

In Fig 1 the valve-casing for the liquid-supply is shown at the bottom at the right hand, with a valve $a$ closing the inlet leading from a supply vessel at a higher level into the pressure vessel and a valve $b$ serving to more or less close the pipe $g$, through which the liquid is discharged from the pressure vessel. At the top of the pressure vessel is the air-discharge $c$ and on the left-hand side the air-inlet $b$. The floats are arranged vertically one above the other. The upper float $e$ operates directly upon the discharge-valve $c$, closing the discharge-opening by upwardly-directed pressure. The lower float $f$ is suspended by a lateral projection upon the air-inlet valve and is so guided by a projection opposite that above mentioned and also by projections $f'$ at the bottom working in the inlet of the vessel as to always remain in a vertical position.

The operation of the apparatus takes place as follows: As soon as the liquid to be raised is allowed to flow from a vat at a somewhat higher level into the pressure vessel the latter becomes filled therewith, while the air previously contained therein escapes at top. When the liquid has nearly filled the vessel, the buoyancy of the two floats exceeds the weight thereof, which has to be regulated according to the specific gravity of the liquid. Owing to the narrowing of the vessel at the upper part, the buoyant action begins to operate somewhat suddenly and causes the floats to rise some millimeters. By this means the air-discharge is closed and the inlet for compressed air $d$ is opened. In consequence hereof the motion of the entering liquid is at once stopped and the gradually-entering air-pressure forces the liquid into the rising main $g$. The speed of flow in the rising main increases until the resistance, which increases with the square of the speed, has become so great that the air-pressure existing in the vessel is held in equilibrium thereby. In order to prevent too rapid a flow of the liquid, a throttling action may be applied at any convenient point. Thus in the arrangement shown if the velocity of the liquid increases very considerably the pressure-valve $b$ will be forced upward, so as to more or less close the entrance to the pipe $g$, only leaving the narrow openings $h$. Also a throttling action operating with greater accuracy relatively to the speed of the liquid can be effected by causing the liquid to enter the circular space $i$ under the pressure-valve in a tangential direction, so that the resulting current flowing round the periphery of such space $i$ impinges laterally upon the entering jet, and thus impedes its entrance more and more the greater the speed is, as indicated in the plan at Fig. 2. If, however, the rising main is long or has several elbows or branches, the resistance to the flow therein will become so great at high speeds as to require a considerable excess pressure of the air in the vessel to overcome it. The air-pressure might also be throttled by means of the shut-off valve on the air-supply. As the liquid sinks in the vesesl it first releases the upper float. This, however, remains pressed against the discharge-opening by means of the excess pressure existing in the vessel. By this means the lower float is freed from the weight of the upper float, which as long as the liquid entered the vessel rested thereon and held it down until the last moment. The lower float allows air-pressure to enter until the liquid has sunk to a certain level, when the float in sinking with the liquid closes the air-pressure valve, and the expansion of the confined air at once commences and continues practically until the complete emptying of the vessel has taken place. The weight and buoyancy of the lower float have to be proportioned in accordance with the above action. If fluctuations in the pressure of the air-supply should take place, an automatic regulation can be effected by reducing the amount of compressed air admitted when the air-pressure is higher. This action can be easily obtained by hollowing out the bottom of the lower float more or less or by making the bottom thereof with an upward arched curvature, as shown in Fig. 3, so that the float $f^2$ contains a bell-shaped hollow $k$, from which extends the projections $f^3$. This hollow remains filled with air from the commencement, during the inflow of the liquid until the pressure of the admitted compressed air effects the compression of the body of air contained in the hollow, so that the liquid will penetrate to an extent into the hollow proportionate to the degree of pressure of air in the vessel. As by this means the volume of water displaced by the float $f$ and its air-cushion will be smaller with a higher pressure of the air-supply than with a lower one, its buoyancy will be correspondingly decreased, and consequently be made to sink sooner, so that the air-pressure-inlet valve will already be closed when the liquid stands at a higher level. When the supply of air-pressure has terminated, the pressure in the vessel sinks, and the raising of the liquid is effected with gradually-decreasing velocity until the excess pressure in the vessel is equal to the statical pressure of the liquid column in the rising main. With a long smooth rising main the pressure can even sink somewhat below the above. As the excess pressure in the vessel decreases the force also decreases, which holds the discharge-valve closed. The weight of the upper float $e$ therefore pulls the ball-valve away from its seat and opens the air-discharge, so as to cause a renewed filling of the vessel with liquid, and the above-described operation is repeated. The weight has to be so regulated in proportion to the area of the valve-seat by weighting the upper float that when the excess pressure in the vessel balances the height of the liquid-column the valve will be opened as described.

What I claim, and desire to secure by Letters Patent of the United States, is—

1. Pressure-discharge devices for liquid-containing casks, comprising a pressure vessel having an inlet for liquid, an air-discharge and a compressed-air inlet, each controlled by a valve, a float for the valve of the air-discharge, and a second float for the valve of the compressed-air inlet, the said floats being in the same axial line.

2. Pressure-discharge devices for liquid-containing casks, comprising a pressure vessel having an inlet for liquid, an air-discharge and a compressed-air inlet, each controlled by a valve, a float for the valve of the air-discharge, and a second float for the valve of the compressed-air inlet, the said floats being in the same axial line and the two floats occupying a vertical position within the said pressure vessel.

3. Pressure-discharge devices for liquid-containing casks, comprising a pressure vessel having an inlet for liquid, an air-discharge and a compressed-air inlet, each controlled by a valve, a float for the valve of the air-discharge, and a second float for the valve of the compressed-air inlet, the said floats being in a vertical position and in the same axial line and the lowermost one thereof having a bell-recess in its bottom.

4. Pressure-discharge devices for liquid-containing casks, comprising a pressure vessel having an inlet for liquid, an air-discharge and a compressed-air inlet, each controlled by a valve, a float for the valve of the air-discharge, and a second float for the valve of the compressed-air inlet, one of said floats working within the other and the two being slidable with reference to each other.

5. Pressure-discharge devices for liquid-containing casks, comprising a pressure vessel having an inlet for liquid, an air-discharge and a compressed-air inlet, each controlled by a valve, a float for the valve of the air-discharge, and a second float for the valve of the compressed-air inlet, the said floats being in vertical position, and in the same axial line the lowermost one thereof having guides therefor working in the inlet for the liquid to the pressure vessel.

6. Pressure-discharge devices for liquid-containing casks, comprising a pressure vessel having an inlet for liquid, an air-discharge and a compressed-air inlet, each controlled by a valve, a float for the valve of the air-discharge, and a second float for the valve of the compressed-air inlet, the said floats being in the same axial line, the two being slidable with reference to each other, the lowermost one thereof having a bell-recess in its bottom and provided with guides working in the inlet for the liquid to the pressure vessel.

7. Pressure-discharge devices for liquid-containing casks, comprising a pressure vessel having an inlet for liquid, an air-discharge and a compressed-air inlet, each controlled by a valve, separate floats for the valves for the air-discharge and compressed-air inlet, one of said valves working within the other telescopically and the two being disposed in a vertical position within the pressure vessel, the float for the said compressed-air inlet being provided with supporting means therefor at its upper edge seated upon the valve of the compressed-air inlet.

In witness whereof I have hereunto signed my name in the presence of two subscribing witnesses.

GEORG LINDNER.

Witnesses:
   JOS. H. LEUTE,
   H. W. HARRIS.